INVENTORS.
REGINALD COUZENS
MICHAEL M. YOUNG

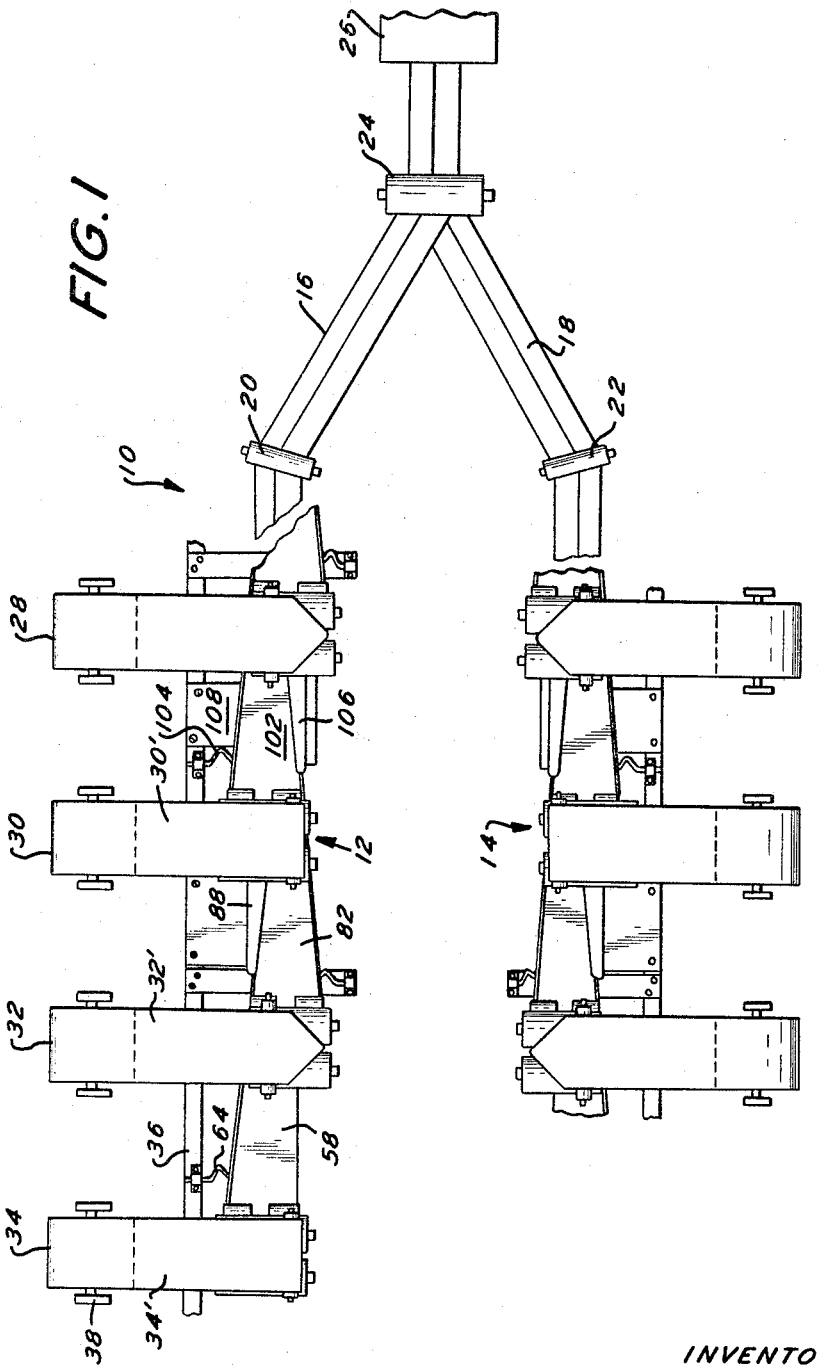
INVENTORS.
REGINALD COUZENS
MICHAEL M. YOUNG
BY Seidel & Gonda
ATTORNEYS.

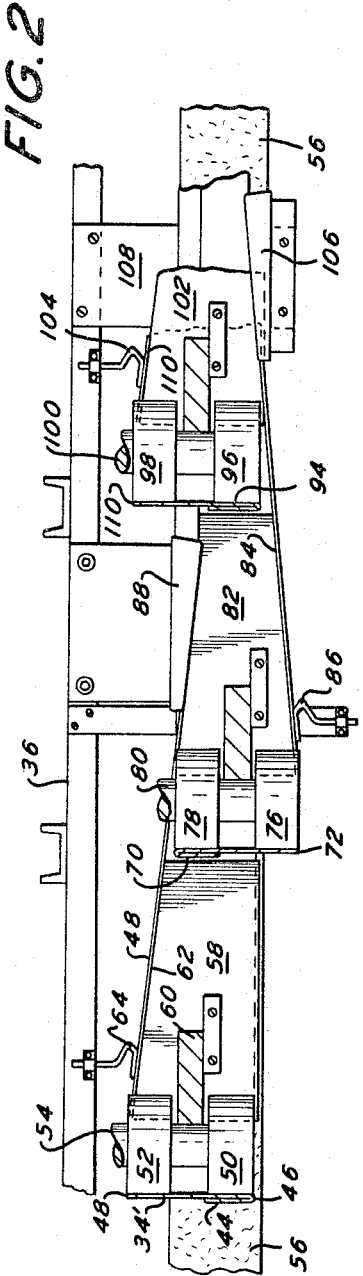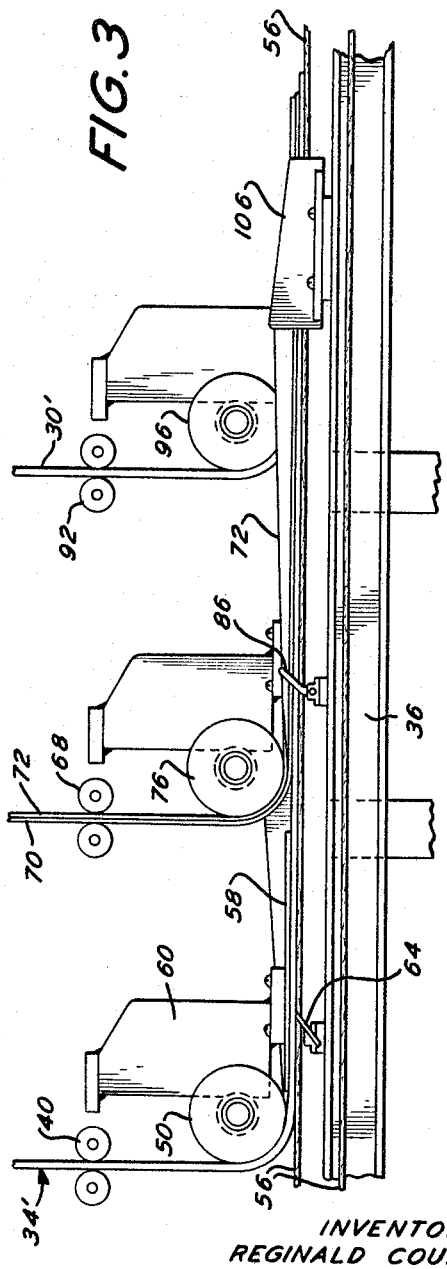

BY *Seidel & Gonda*

ATTORNEYS.

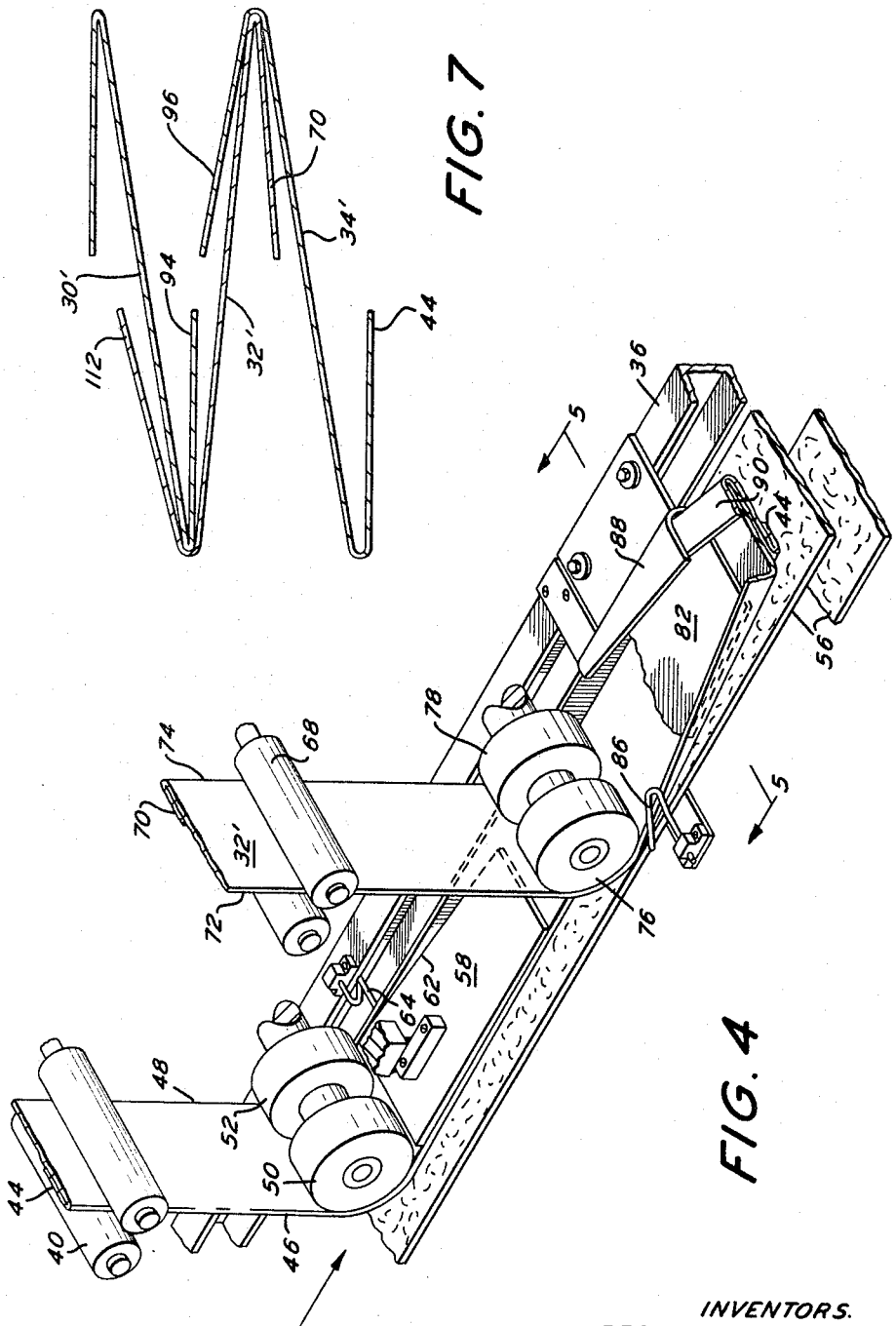

United States Patent Office 3,330,553
Patented July 11, 1967

3,330,553
WEB MATERIAL HANDLING APPARATUS
AND METHOD
Reginald Couzens, Wallingford, and Michael M. Young, Philadelphia, Pa. (both % Dietz Machine Works, Inc., 3105 W. Allegheny Ave., Philadelphia, Pa. 19132)
Filed Dec. 14, 1964, Ser. No. 417,933
8 Claims. (Cl. 270—40)

This application is a continuation-in-part of our co-pending application Ser. No. 369,730 filed on May 25, 1964, now Patent No. 3,291,478 and entitled Apparatus and Method for Producing Z-Folded Web Material.

This invention relates to web material handling apparatus and method for producing Z-folded material. More particularly, this invention relates to such apparatus and method for producing a rope of Z-folded, orientated webs of a cellulose material such as facial tissue which may thereafter be cut into lengths suitable for boxing.

In the manufacture of a rope of web material having, for example, 400 layers of such web material, there are necessarily 400 stations. The length of the production line is capable of being cut in half by having two parallel production lines whose output is superimposed. We have found that the length of each of the parallel production lines can be further reduced in half by accomplishing the folding of the orientated webs in two stages. Depending upon the nature of the material of the webs, there is a minimum distance which must be maintained between stations as per the generally accepted practice. This generally accepted practice results in the fact that certain materials such as the cellulose material used for facial tissues require a certain distance of travel before it can be folded, especially at high speeds.

In accordance with the present invention, the web material is folded in two stages with one of the stations between the two stages. This is accomplished by simultaneously folding the webs from two stations at the locations between any two stations as will be made clear hereinafter.

It is an object of the present invention to provide a novel apparatus and method for producing a rope of Z-folded web material.

It is another object of the present invention to fold the web material in two stages with a station between said stages thereby substantially cutting the length of the production line in half.

It is another object of the present invention to provide a novel apparatus and method for folding and interleafing Z-folded webs of cellulose material suitable for use as facial tissues.

It is another object of the present invention to provide a novel apparatus and method for folding, associating J-folded layers of web material to form a rope of interleafed Z-folded cellulose material without lifting up previously formed folds in order to associate the layers. Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial top plan view of the apparatus of the present invention.

FIGURE 2 is a partial top plan view of the apparatus of the present invention on an enlarged scale.

FIGURE 3 is a side elevation view of the apparatus illustrated in FIGURE 2.

FIGURE 4 is a partial perspective view of the apparatus illustrated in FIGURES 2 and 3.

FIGURE 7 is an exploded diagrammatic view illustrating the interleafing and associating of Z-folded layers of web material produced by the apparatus and method of the present invention.

Referring to the drawing in detail, wherein like numerals indicate like elements, there is shown in FIGURE 1 a partial top plan view of the apparatus of the present invention designated generally as 10.

Figure 5:
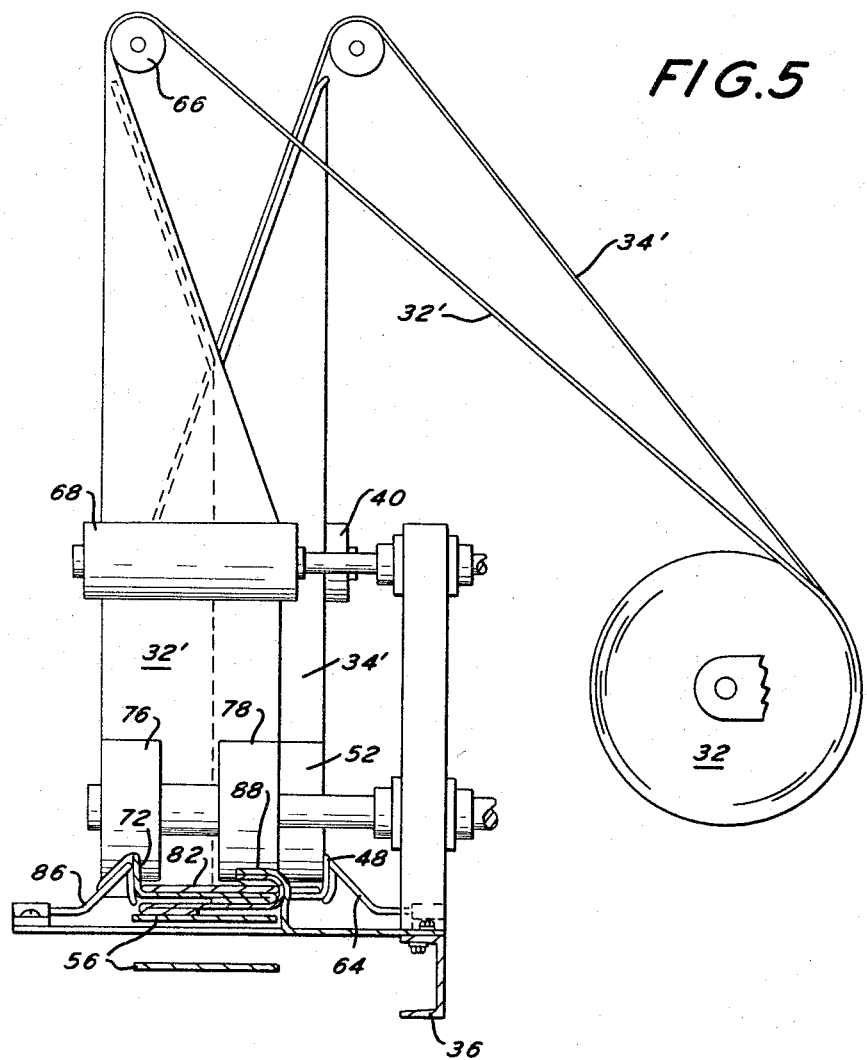
FIGURE 5 is a sectional view taken along the line 5—5 in FIGURE 4.
Figure 6:
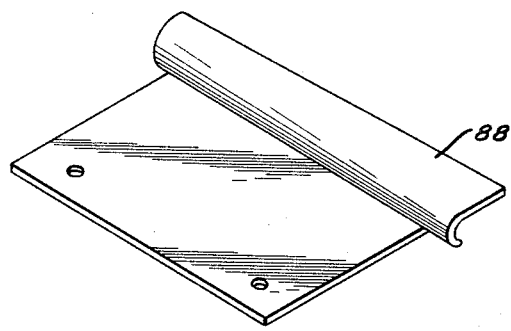
FIGURE 6 is a perspective view of a shaping member.

The apparatus 10 includes a first manufacturing line 12 and a second manufacturing line 14. Each of the manufacturing lines 12 and 14 produce a rope half. The rope half 16 produced by manufacturing line 12 is caused by guide roller 20 to change direction and move toward the rope half 18.

The rope half 18 produced by manufacturing line 14 is caused to change direction by guide roller 22 and moves toward the rope half 16. The rope half 16 is superimposed over the rope half 18 and at guide roller 24; the superimposed rope halves pass as a single rope to a cutter device 26 which cuts the hope into unit lengths which are then subsequently boxed.

Assuming that it is desired to produce boxed lengths having 400 layers of web material, each of the manufacturing lines 12 and 14 would have 200 stations. In connection with the production of a rope of web cellulose material suitable as facial tissues, the distance between the stations has been approximately 3 feet. As will be made clear hereinafter, the distance between stations may be reduced to approximately 18 inches.

Each of the manufacturing lines 12 and 14 are identical. Hence, for the purposes of the present disclosure it is deemed sufficient to only describe manufacturing line 12 in detail. Assuming that it is desired to produce a rope having 400 layers of web material as referred to above, manufacturing line 12 will have 200 stations. Since every other station is identical, it is deemed sufficient for the purposes of the present disclosure to describe only 3 stations in detail.

At each station of manufacturing line 12, there is provide a roll of web material for unwinding about an axis parallel to the direction of movement of rope 16 along the manufacturing line 12. For example, in FIGURE 1 the manufacturing line 12 is illustrated as including rolls 28, 30, 32 and 34 all disposed on the same side of the manufacturing line 12 and in line with one another.

The station at which roll 28 is located is identical with the station at which roll 32 is located. Likewise, the station at which roll 30 is located is identical with the station at which roll 34 is located. The manufacturing line 12 includes a frame designated generally as 36 on which the various components are supported. For clarity of illustration, much of the frame 36 has been eliminated in some of the figures.

As is conventional, the frame may be made from steel channel members. The roll of web material 34 is supported by a bracket 38 connected to the frame 36. The web material 34' is unwound from the roll 34, extends upwardly around a roller, downwardly around a shaper, and is pulled downwardly as a J-folded web between a pair of rollers 40, one of which is a driven roller. The rollers 40 are preferably supported from the frame 36 as cantilever beams to facilitate threading the web material.

As shown more clearly in FIGURE 2, the material 34' is at this location in the form of a J-folded web having a flap 44, a fold line 46 along one edge and a free edge 48 on the opposite side. The thusly folded material 34' passes downwardly beneath a pair of pressure rollers 50 and 52 on shaft 54 supported as a cantilever beam from the frame 36. As the material 34' passes beneath the pressure rollers 50 and 52, it contacts an endless belt 56 supported by the frame 36.

Immediately after making contact with belt 56 and passing beneath rollers 50 and 52, the material 34' passes beneath a plate 58 supported at the bottom of bracket structure 60. The bracket structure 60 is preferably supported as a cantilever beam from the frame 36. The plate 58 has a reference surface 62 which is slightly tapered so that the distance across its forward end is smaller than the distance across the end adjacent the rollers 50 and 52.

As shown more clearly in FIGURES 2 and 4, the free edge 48 is caused to move an arc of 90° upwardly by turning bar or member 64. To facilitate such turning of the edge 48, the same is accomplished against reference surface 62. At this point, it will be noted that the flap 44 is on the lowermost surface of the material 34' in contact with the belt 56. As will be apparent from a comparison of FIGURES 2 and 3, the turning bar 64 extends downwardly and inwardly at an acute angle with respect to the longitudinal axis of shaft 54. Since the belt 56 is driven, the material 34' is pulled along the belt to the next station which may be as much as fifty percent closer than conventional machines heretofore. This shortening of the manufacturing line 12 can be accomplished since the edge 48 has not been completely turned over.

At the next station, web material 32' is unwound from roll 32, drawn upwardly over roller 66, and then drawn downwardly over a shaping device by a pair of rollers 68. One of the rollers 68 may be a driven roller. Rollers 68 are preferably supported as cantilever beams from the frame 36 to facilitate threading of the material 32'. As the material 32' is pulled down between the rollers 68, it is provided with a J-fold resulting in a flap 70, a free edge 72 opposite from a fold line 74.

The material 32' then passes beneath pressure rollers 76 and 78 on shaft 80. The shaft 80 is preferably supported in cantilever fashion from the frame 36. It will be noted that the rollers 76, 78 are offset with respect to rollers 50 and 52. A plate 82 is supported in front of the rollers 76 and 78 in the same manner as plate 58.

As shown more clearly in FIGURE 2, plate 82 has a straight edge on one side and a tapered edge 84 on the opposite side. Tapered edge 84 acts as a reference surface. The reference surface provided by edge 84 is on the opposite side from the reference surface 62. A turning bar 86 is supported in front of pressure roller 76 for turning the free edge 72 of the material 32' upwardly through an arc of 90°.

A shaping plow 88 is supported by the frame 36 on the opposite side of the line 12 from the turning bar 86. Plow 88 intercepts the inner free edge 40 and causes the same to move the article 90° so as to overlap the edge portion of material 32' adjacent the fold line 74 to provide a flap 90. The flap 90, like flap 44, extends almost to the centerline of the rope half. The plow 88 may be supported from the frame 36 in any convenient manner.

Thus, it will be noted that at this point at the station containing pressure rollers 76 and 78 material 32' is having its initial fold being provided while the fold for material 34' is being completed. The completion of the folding of material 32' will be accomplished at the next station. At the next station, web material 30' is unwound over roller 30, pulled upwardly over an idler roller, pulled downwardly over a shaping device to shape the material with a J-fold and then downwardly by and between pressure rollers 92. As shown more clearly in FIGURE 2, material 30' has a flap 94 comparable to flap 44. In fact, the material 30' is treated in the same way as the material 34'. Thus, it will be noted that the material 30' passes beneath pressure rollers 96 and 98 on shaft 100. The rollers 96 and 98 are in line with the rollers 50 and 52. A plate 102, comparable to plate 58, is supported in the same manner in front of rollers 96 and 98. Plate 102 is identical with plate 58.

A turning bar 104 is provided in front of roller 98 in the same manner and to perform the same function as turning bar 64. A shaping plow 106 is supported opposite a straight reference edge on the plate 102. It will be noted that plow 106 is supported in cantilever fashion by plate 108 from the frame 36.

It will be recalled that the free edge 84 was turned upwardly through an arc of approximately 90° by the turning bar 86. The completion of the turning of free edge 84 through another 90° is accomplished by plow 106. While plow 106 is accomplishing this function, turning bar 104 is causing the free edge 110 on material 30' to be moved upwardly through an arc of approximately 90°. Thus, the flap formed by the overturned free edge 84 as completed by plow 106 results in a flap 112 which overlies the material 30'. FIGURE 7 is an exploded diagrammatic view in which the various web materials have been indicated and shaped into Z-folded material. In this manner, tissues will pop out one at a time when boxed in a conventional manner.

In place of the shaping plows 88 and 106, other equivalent devices may be utilized. For example, the function of these plows may be accomplished by a rod tapered in a direction generally opposite to the direction of movement of the rope and extending at an acute angle with respect to the side edges of the rope.

Since the station at which roll 30 is located is identical with the station at which roll 34 is located, a complete sequence of the different stations has been described. It will be noted that the various rollers and guides for the web material are supported in cantilever fashion to facilitate ease of threading the material through the entire machine prior to starting up operations. Also, this structural interrelationship facilitates the ease with which the machine may be placed back into operation when one or more of the webs becomes broken. Also, ease of maintenance is obtained by this structural interrelationship. Since the various rolls are supported for unwinding about an axis parallel to the direction of movement of the rope, the two stage folding of the web material facilitates a substantial shortening of the production line without affecting the speeds at which the rope can travel.

It will be appreciated that in order to accomplish the upward fold of the free edge around a folded edge of the web material at the next station, the various J-folded web materials pass beneath pressure rollers which are staggered with respect to one another. Also, it will be apparent that the flaps on the J-folded web material at the various stations are staggered with respect to one another as shown more clearly in FIGURES 2 and 4. It will be apparent that each layer of web material added to the rope initially has its free edge portion extending beyond the side edges of the rope as it passes beneath its associated pressure rollers.

The present invention may be embodied in other specific forms without departing from the spirit or essential attributes thereof and, accordingly, reference should be made to the appended claims, rather than to the foregoing specification as indicating the scope of the invention.

It is claimed:
1. A method of producing Z-folded interleafed layers of facial tissue comprising the steps of unwinding facial tissue web material from rolls having their axes of rotation parallel to the intended direction of movement of a rope at spaced points along a conveyor means, folding the facial tissue web material from each roll with a J-fold, superimposing a first layer of the J-folded web material on a conveyor means with a free edge portion thereof extending beyond and to one side of the conveyor means, folding said free edge portion upwardly, superimposing a second layer of J-folded web material over said first-mentioned layer with a free edge portion of the second layer extending beyond and to one side of the intended rope, then completing the folding of said free edge portion of said first layer so that it will overlap a folded edge of said second layer.

2. Apparatus comprising a frame, a plurality of successive stations including a first and second station spaced along said frame along a web folding path, each of said stations having a means for supplying a web to said path and for folding one free edge of the web upon itself to form a J-fold, said means forming J-folds on successive webs on alternately opposite sides of said webs at successive stations, means adjacent each station for folding the other free edge of each web upwardly against a reference surface, means for guiding the upwardly folded edge of the web of the first station through the second station, means adjacent the second station for folding said upwardly folded free edge of the web of the first station over the J-fold of the web of the second station overlying said web of the first station, and conveying means for moving webs along the web folding path.

3. Apparatus in accordance with claim 2 wherein said means for forming a J-fold includes a pair of rollers supported as cantilever beams from said frame, whereby the web may more easily be threaded between said rollers.

4. Apparatus in accordance with claim 2 wherein said means for folding said free edge of each web upwardly includes plates supported adjacent each station and below which the webs from previous stations will pass, the plates at alternate stations being identical and similarly located but of opposite hand, and the plates at alternate stations having said reference surface on a side edge thereof and on opposite sides with respect to a rope which is formed by a plurality of layers of said webs.

5. Apparatus in accordance with claim 4 including a cantilever member supporting each plate from the frame.

6. Apparatus in accordance with claim 2 including a pair of pressure rollers at each station, said conveying means comprising a movable belt beneath the pressure rollers at said stations, and the pressure rollers being positioned so that the web from each station will pass around a portion thereof and between the pressure rollers and the belt whereby the web will be positioned on top of the web from the next preceding station.

7. Apparatus in accordance with claim 2 wherein said means adjacent the second station includes a rod-like member on one side of said station and a shaping plow on the opposite side of said station.

8. A method of folding a plurality of webs into a rope comprising the steps of unwinding a plurality of rolls of webs at a plurality of spaced successive stations including a first and second station onto a web folding path and onto a conveyor means, folding each web with a J-fold so that adjacent layers of webs have their J-folded edges on opposite sides of the conveyor means, superimposing each J-folded web onto the conveyor means to form a rope, folding a free edge of a web upwardly adjacent the first station, conveying such web with the upwardly folded edge beyond the second station, superimposing the web of the second station over the web of the first station while folding a free edge of the web of the second station upwardly, and folding the free edge of the web of the first station over the J-folded edge of the web of the second station.

References Cited

UNITED STATES PATENTS

| | | | |
|---|---|---|---|
| 1,992,179 | 2/1935 | Blosser et al. | 270—94 X |
| 2,642,279 | 6/1953 | Teall | 270—40 |
| 3,199,861 | 8/1965 | Presnell et al. | 270—40 |

EUGENE R. CAPOZIO, *Primary Examiner.*

N. M. ELLISON, P. WILLIAMS, *Assistant Examiners.*